United States Patent
Ritter

(10) Patent No.: US 11,063,667 B1
(45) Date of Patent: Jul. 13, 2021

(54) SYSTEMS, DEVICES, AND METHODS FOR OPTICAL COMMUNICATION

(71) Applicant: Raytheon BBN Technologies, Corp., Cambridge, MA (US)

(72) Inventor: Scott Ritter, Sudbury, MA (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 0 days.

(21) Appl. No.: 17/098,150

(22) Filed: Nov. 13, 2020

Related U.S. Application Data

(60) Provisional application No. 63/059,077, filed on Jul. 30, 2020.

(51) Int. Cl.
| | |
|---|---|
| *H04B 10/00* | (2013.01) |
| *H04B 10/2587* | (2013.01) |
| *H04B 10/112* | (2013.01) |
| *H04B 10/516* | (2013.01) |
| *H04J 14/00* | (2006.01) |

(52) U.S. Cl.
CPC ..... *H04B 10/2587* (2013.01); *H04B 10/1121* (2013.01); *H04B 10/516* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| | | | | |
|---|---|---|---|---|
| 2020/0096760 | A1* | 3/2020 | Narita | H04N 9/3179 |
| 2020/0389582 | A1* | 12/2020 | Herman | H04N 5/2353 |

OTHER PUBLICATIONS

Alzugaray et al., Asynchronous Corner Detection and Tracking for Event Cameras in Real-Time, IEEE Robotics and Automation Letters, Jun. 22, 2018, 8 pages, vol. 3, Issue 4, IEEE, New York City, New York.
Feng et al., Event Density Based Denoising Method for Dynamic Vision Sensor, Applied Sciences, Mar. 16, 2020, 18 pages, 10, 2024, MDPI, Switzerland.

(Continued)

*Primary Examiner* — Daniel G Dobson

(57) ABSTRACT

A technology is described for optical communication. An example of the technology can include receiving an event stream containing indications of independent events detected by pixels in an event camera. An event may be a change in brightness detected by a pixel in the pixel array, and the pixel independently generates an indication of the event in response to detecting the event. The event stream can be demultiplexed into a plurality of communication streams containing related events associated with a plurality of communication sources. The events contained in a communication stream can be aggregated based in part on an event proximity and an event time that associates an event with other events contained in the event stream. The plurality of communication streams can be demodulated to extract optically transmitted information from the plurality of communication streams, which can be sent to a data consumer.

20 Claims, 7 Drawing Sheets

(56) References Cited

OTHER PUBLICATIONS

Khodamoradi et al., O(N)-Space Spatiotemporal Filter for Reducing Noise in Neuromorphic Vision Sensors, IEEE Transactions on Emerging Topics in Computing, Jan. 1, 2018, 8 pages, IEEE, New York City, New York.

Mueggler et al., Fast Event-based Corner Detection, British Machine Vision Conference, Sep. 7, 2017, 11 pages, London.

Padala et al., A Noise Filtering Algorithm for Event-Based Asynchronous Change Detection Image Sensors on TrueNorth and Its Implementation on TrueNorth, Frontiers in Neuroscience, Mar. 5, 2018, 14 pages, vol. 12, Frontiers Media S.A. Switzerland.

Vasco et al., Fast Event-based Harris Corner Detection Exploiting the Advantages of Event-driven Cameras, 2016 IEEE/RSJ International Conference on Intelligent Robots and Systems, 2016, 6 pages, IEEE, Switzerland.

\* cited by examiner

SYSTEMS, DEVICES, AND METHODS FOR OPTICAL COMMUNICATION

RELATED APPLICATIONS

This application claims the benefit of U.S. Provisional Patent Application Ser. No. 63/059,077, filed Jul. 30, 2020, entitled, "Spatially Multiplexed Optical Receiver (SMOR)," which is incorporated by reference in its entirety herein.

BACKGROUND

Optical communication, also known as optical telecommunication, is communication at a distance using light to carry information. An optical communication system uses a transmitter to encode a message into an optical signal, a channel to carry the signal to a destination, and a receiver to reproduce the message from the received optical signal. Free-space optical communication (FSO) is an optical communication technology that uses light propagating in free space (e.g., air, outer space, vacuum, etc.) to wirelessly transmit data for telecommunications or computer networking. FSO systems can function over distances of several kilometers when there is a clear line of sight between a communication source and a communication destination that allows an optical receiver to reliably decode the transmitted information contained in the optical signal. Other free-space systems can provide high-data-rate, long-range links using small, low-mass, low-power-consumption subsystems which make them suitable for communications in space. Various artificial satellite constellations configured to provide global broadband coverage can take advantage of the benefits of optical communication by employing laser communication for inter-satellite links between satellites, effectively creating a space-based optical mesh network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
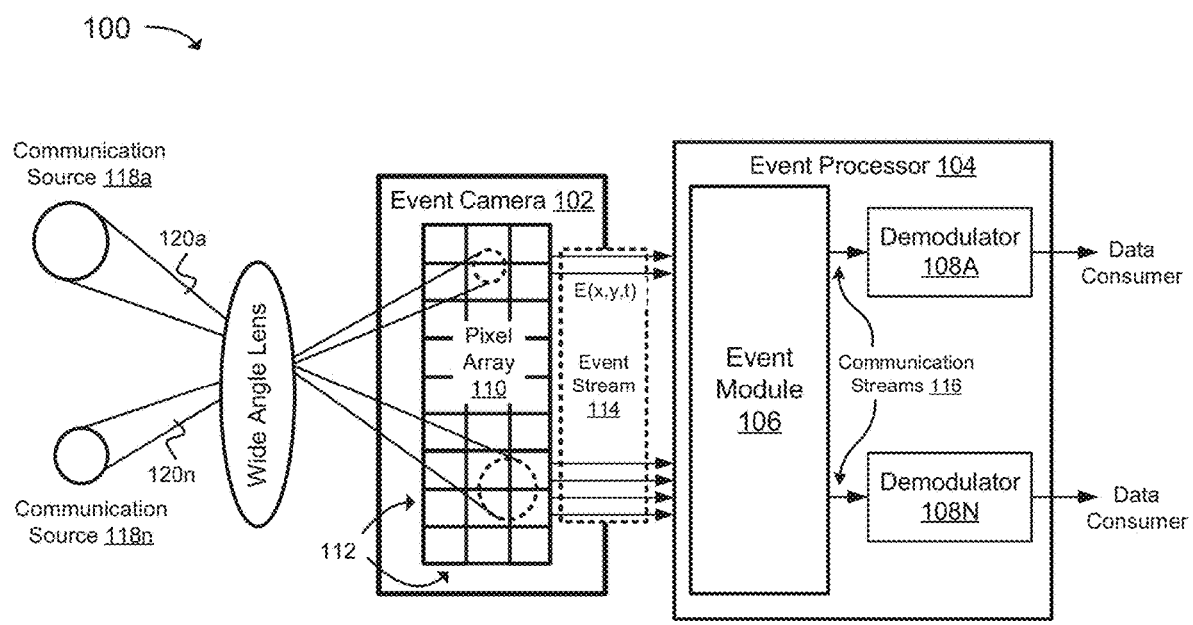
FIG. 1 is a block diagram illustrating an example optical communication system, in accordance with an example of the technology.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

Technologies are described for optical communication using an event camera to receive optically transmitted information transmitted by a communication source. In one example of the technology, a spatial region can be monitored for optical communications using an event camera that outputs an asynchronous stream of events triggered by changes in scene illumination. The event camera includes an array of pixels configured to independently detect an event associated with an optical communication and independently generate an indication of the event associated with the optical communication. An event detected by a pixel in the pixel array can be a change in brightness. In response to detecting the change in brightness, the pixel generates an indication of the event comprising, for example, a discrete packet of information (e.g., a data packet or message) containing a pixel address and a timestamp.

An event stream output by the event camera can represent one or more optical signals (optically transmitted information) received from one or more communication sources (e.g., artificial satellites, aircraft, ground stations, etc.). Optical signals represented in the event stream can be separated by demultiplexing the event stream into multiple communication streams, where each communication stream contains event data representing an optical signal received from a communication source. Demultiplexing the event stream can comprise identifying spatially and/or temporally related events and aggregating the related events into a communication stream associated with a communication source. For example, the spatially and/or temporally related events can be labeled as a communication received from a common communication source, and the label can be used to aggregate the spatially and/or temporally related events into a corresponding communication stream. The communication stream can be demodulated to extract the optical signal from the communication stream, and the optical signal can be sent to a data consumer, such as an optical receiver, an application, a program, a process, or another consumer of the optical signal.

To further describe the present technology, examples are now provided with reference to the figures. FIG. 1 is a diagram illustrating an example optical communication system 100. The optical communication system 100 can be coupled to or integrated in an object, such as a satellite, ground station, vehicle, and the like, to allow for optical communications between a source object and a destination object. The optical communication system 100 can include an event camera 102 and an event processor 104. The event camera 104, also referred as a neuromorphic camera, silicon retina or dynamic vision sensor, is an imaging sensor that responds to local changes in brightness. In contrast to most conventional cameras, an event camera 104 does not capture images using a camera shutter. Instead, each pixel 112 in a pixel array 110 operates independently and asynchronously, each reporting changes in brightness as they occur (referred to herein as an "event"). For example, each pixel 112 stores a reference brightness level (e.g., a preset threshold), and continuously compares the reference brightness level to a current level of brightness. If a difference in brightness exceeds the reference brightness level, the pixel 112 resets the reference brightness level and generates an indication of the event, which can comprise a data packet of information or message containing the pixel's address (e.g., x, y, or other spatial coordinates in the pixel array 110) and a timestamp indicating a time of the event (i.e., a time that the event occurred). In some examples of the present technology, events generated by pixels 112 in the event camera 104 can also contain a polarity (increase or decrease) of a brightness change, or a measurement of a current level of illumination.

The event camera 104 outputs an asynchronous event stream 114 triggered by changes in scene illumination individually and independently detected by the pixels 112 in the pixel array 110 (e.g., a serial stream of asynchronous events). The event stream 114 contains the indications (e.g., data packets, messages, etc.) of events asynchronously generated by one or more of the pixels 112. As illustrated, the event stream 114 is provided to the event processor 104, which is configured to demultiplex the event stream 114 into individual communication streams 116 and demodulate each communication stream 116 to extract optically transmitted information encoded in the communication stream 116.

In one example configuration, the event processor 104 can include an event module 106 and a plurality of demodulators 108*a-n* ("n" representing any number of demodulators). The event module 106 can be hardware (e.g., a field programmable gate array, integrated circuit, etc.) or software (a software program component of the event processor 104) configured to receive an event stream 114 from the event camera 102 and demultiplex the event stream 114 into one or more communication streams 116 associated with one or more communication sources 118*a-n* ("n" representing any number of communication sources). To illustrate, and as examples, a communication source 118*a-n* can be a satellite, a ground station, a vehicle, or any other object, or any combination of these, configured to send optical communications to the optical communication system 100. As will be appreciated, although FIG. 1 shows that the event stream 114 is demultiplexed into two communication streams 116 associated with two communication sources 118*a-n*, the event steam 114 can contain any number of communications associated with any number of communication sources 118*a-n* which can be demultiplexed into corresponding communication streams 116.

In one example, the event processor 104 can demultiplex an event stream 114 into one or more communication streams 116 by analyzing event information contained in the event stream 114 and identifying related events which can be aggregated into a communication stream 116 associated with a particular communication source 118*a-n*. In one example, events can be considered related using a spatial time relationship between events in the event stream 114, which a spatial time relationship can be determined using event proximity and event time, which can indicate that the events are associated with a common communication source 118*a-n*. More specifically, event information generated by a pixel 112 can include a pixel address and a timestamp, and the event module 106 can use the pixel address and timestamp to identify other events that occurred close in time and proximity to the event. Based on the closeness of time and proximity, an assumption can be made that the event is related to the other events, and that the related events are associated with optically transmitted information transmitted by a communication source 118*a-n*. As an illustration, optically transmitted information transmitted by a communication source 118*a-n* may be received at the event camera 102, triggering at least a portion of the pixels 112 which are adjacent to one another in the pixel array 110 to generate indications of events (e.g., data packets or messages containing pixel addresses and timestamps) output in an event stream 114. The adjacent events may be close in time, such that a time (e.g., a millisecond or less) between a first pixel detecting a first event and an adjacent second pixel detecting a second event can indicate that the first event and the second event are related. The difference in time between detected events that would establish detected events as being related can be any pre-determined duration. In one example, the time duration can be one millisecond or less.

The event module 106 can aggregate related events into a communication stream 116. As a light encoded signal (e.g., omnidirectional communication emissions 120*a-n*) is locally focused onto the pixel array 110 using a wide angle lens and traverses the focal plane array of the event camera 102, subsequent events generated by the pixels 112 in response to detecting the light encoded signal can be identified as being related to the events aggregated into the communication stream 116, and the subsequent events can be aggregated into the communication stream 116.

Events in the event stream 114 which are unrelated to other events in the event stream 114 can be discarded by the event module 106 as noise contained in the event stream 114. This type of denoising can be based on space-time event density. For example, as part of analyzing the event proximities and event times for events in the event stream 114 to identify related events, the event module 106 can discard events which have not been identified as being related to other events, or a sufficient number of other events. The events can be discarded by overwriting or deleting the event information from computer memory. As will be appreciated, other known denoising methods and filters can be used with the present technology.

The event module 106 can send a communication stream 116 to a demodulator 108*a-n* which can attempt to extract optically transmitted information from the communication stream 116. The event processor 104 can include multiple instances of the demodulator 108*a-n* to allow for parallel processing of communication streams 116 in the event stream 114. In one example, the number of demodulators 108*a-n* available to process communication streams 116 may be fixed. In another example, the number of demodulators 108*a-n* available to process communication streams 116 may be based on an amount of available computing resources. For example, the event processor 104 can launch an instance of the demodulator 108*a-n* for each communication stream 116 in the event stream 114 when a sufficient amount of computing resources are available to execute the instances of the demodulator 108a-n.

The demodulator 108a-n can attempt to extract optically transmitted information from a communication stream 116 by analyzing event proximities (e.g., pixel addresses) and event times (e.g., timestamps) of events in a communication stream 116 and identify a communication (e.g., optically transmitted information) encoded in the communication stream 116. In a simplified configuration, a communication source 118a-n can encode a communication in an omnidirectional communication emission using a frequency at which a single pixel 112 can detect an event (e.g., one kilohertz), and the demodulator 108a-n can reproduce the communication (e.g., a square wave) based on the events in a communication stream 116 associated with the communication source 118a-n. The data bandwidth of the communication may be based on the ability of the pixel 112 to detect an event and reset to detect a next event (e.g., a refractory period of one millisecond). In a more complex configuration, event times of events detected by adjacent pixels 112, which may occur at separations of less than the refractory period, can be processed to allow for a higher bandwidth communication. For example, a combination of times and coordinates for events from two or more pixels 112 within the same demultiplexed stream can be used to resolve the duty cycle of a square wave modulating signal with a precision of better than pixel refractory period, allowing for a higher data bandwidth communication (e.g., ten kilohertz). As an illustration, a communication stream 116 can contain event time data for an aggregate group of events detected close in time by pixels 112 that are adjacent to one another, and the demodulator 108a-n can process the event time data to produce high bandwidth optically transmitted information, which can be output to a data consumer, such as an optical receiver, an application, a program, a process, or another consumer of the optically transmitted information.

Figure 2A:
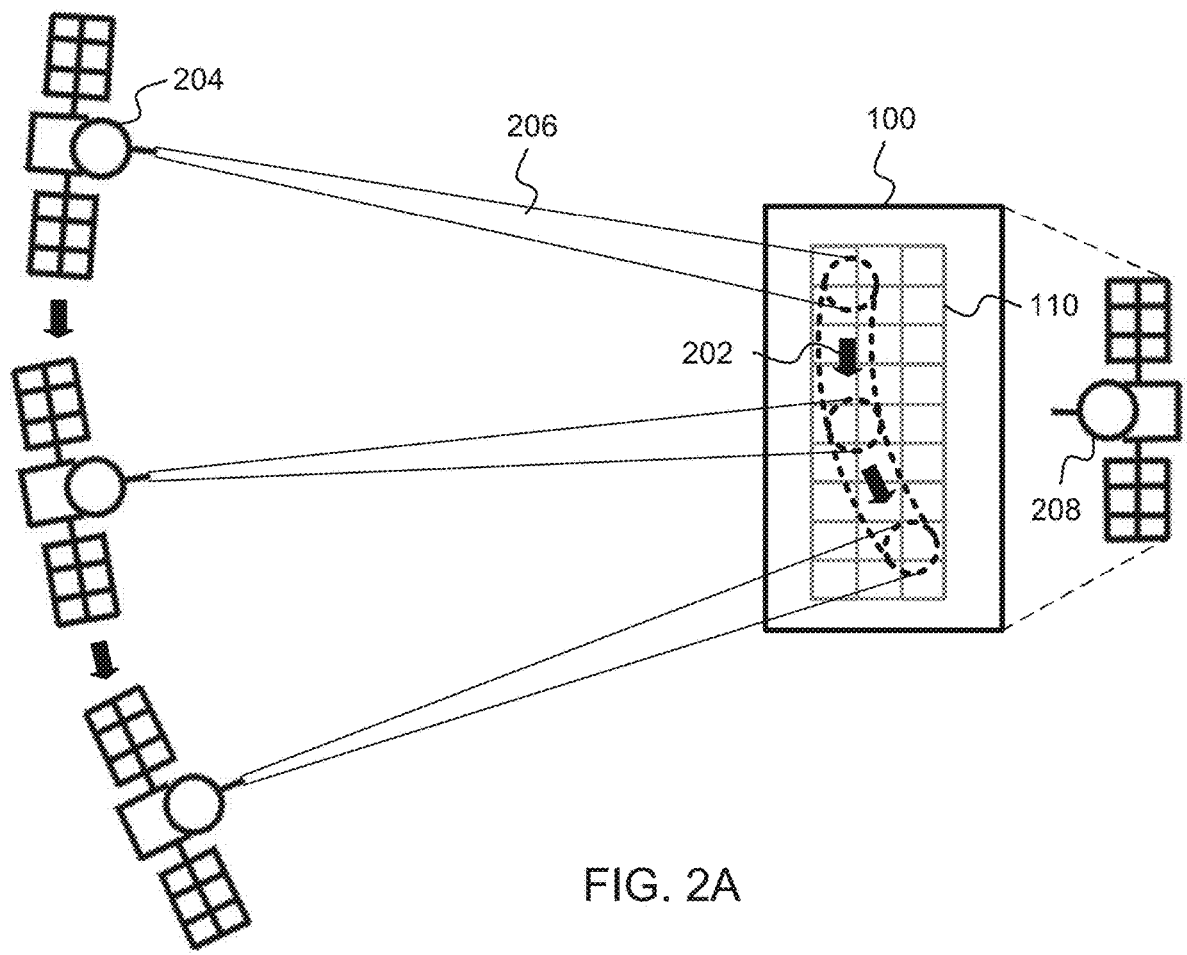
FIG. 2A is a diagram that illustrates an example of tracking a communication received from a communication source, in accordance with an example of the technology.

In one example configuration, as part of identifying a communication (e.g., optically transmitted information) represented in the event stream 114 and generating a communication stream 116 for the communication, the event processor 104 can be configured to track the communication and identify the communication source 118a-n associated with the communication. For example, as shown in FIG. 2A, and with continued reference to FIG. 1, a communication source may include a source satellite 204 that transmits a wide beam or omnidirectional emission 206 using a high brightness light device (e.g., high-brightness light-emitting diode (LED) or laser). The omnidirectional emission 206 containing the communication can be received at the optical communication system 100, which may be coupled to a destination satellite 208. The omnidirectional emission 206 may strike the pixel array 110 in the event camera 102 of the optical communication system 100, and traverse a focal plane of the pixel array 110 in a direction that corresponds to an orbit of the source satellite 204 and/or of the destination satellite 208 activating pixels 112 in the path 202 of the omnidirectional emission 206. The pixels 112 in the path 202 of the omnidirectional emission 206 generate indications of events (change in detected brightness) in response to detecting the omnidirectional emission 206, as described earlier. The event processor 104 can track the path 202 of the omnidirectional emission 206 as the omnidirectional emission 206 traverses the focal plane of the pixel array 110, and based in part on the path 202 of the omnidirectional emission 206, the event processor 104 can determine a generalized location of the source satellite 204 in three-dimensional (3D) space. For example, contextual information can be used to perform a 3D localization from the 2D pixel array 110. The 2D localization can provide a relative angle and azimuth to a communication source.

Figure 2B:
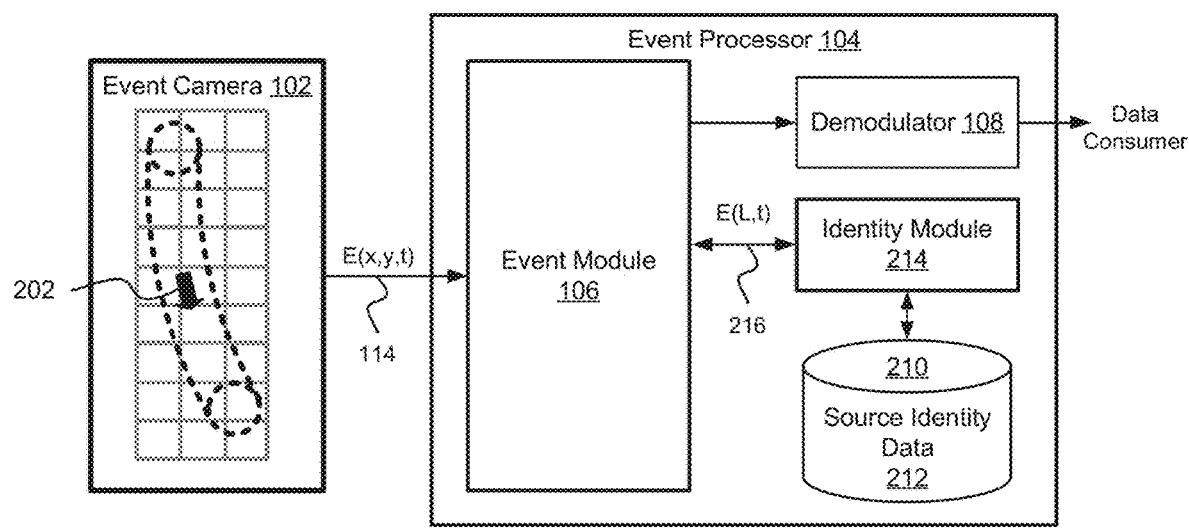
FIG. 2B is a block diagram that illustrates an example optical communication system configured to identify a communication source, in accordance with an example of the technology.

As shown in FIG. 2B, and with continued reference to FIG. 1, the event processor 104 can be configured such that the event module 106 detects the path 202 of a omnidirectional emission 206 via a progression of contiguous events that traverses the pixel array 110 of the event camera 102. The event module 106 analyzes pixel addresses (e.g., x, y coordinates in the pixel array 110) and timestamps contained in the event stream 114 to identify the path 202 of the omnidirectional emission 206 on the pixel array 110, and the event module 106 sends path information 216 (e.g., path location and time) for the path 202 to an identity module 214 configured to translate the path information 216 to an azimuth and elevation location vector relative to the receiver's location in 3-D space. The identity module 214 can cross reference the location vector in 3-D space with a known location of a communication source and classify or tag the source satellite 204 as the known communication source. The identity module 214 can cross reference the path information 216 by querying a data store 210 for pre-existing, stored source identity data 212 that corresponds to the path information 216. The source identity data 212 may indicate an expected physical location of a known communication source at a specified time. In the case that the location and time contained in the path information 216 corresponds to the physical location and specified time in the source identity data 212, the communication source (e.g., the source satellite 204) can be positively identified as the known communication source specified in the source identity data 212. In the case that the communication source (e.g., the source satellite 204) cannot be positively identified, the event module 106 may discard or ignore events associated with the communication source. Also, in one example, the source identity data 212 can specify whether a known communication source is a trusted communication source, and the event processor 104 can classify a communication as trusted or not trusted based in part on whether the known communication source is identified as a trusted communication source.

The various processes and/or other functionality contained within the optical communication system 100 may be executed on one or more processors that are in communication with one or more memory modules. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media.

The data store may be representative of a plurality of data stores as can be appreciated. While the figures illustrate examples of a system that may implement the techniques above, many other similar or different environments are possible. The example environments discussed and illustrated above are merely representative and not limiting.

Figure 3:
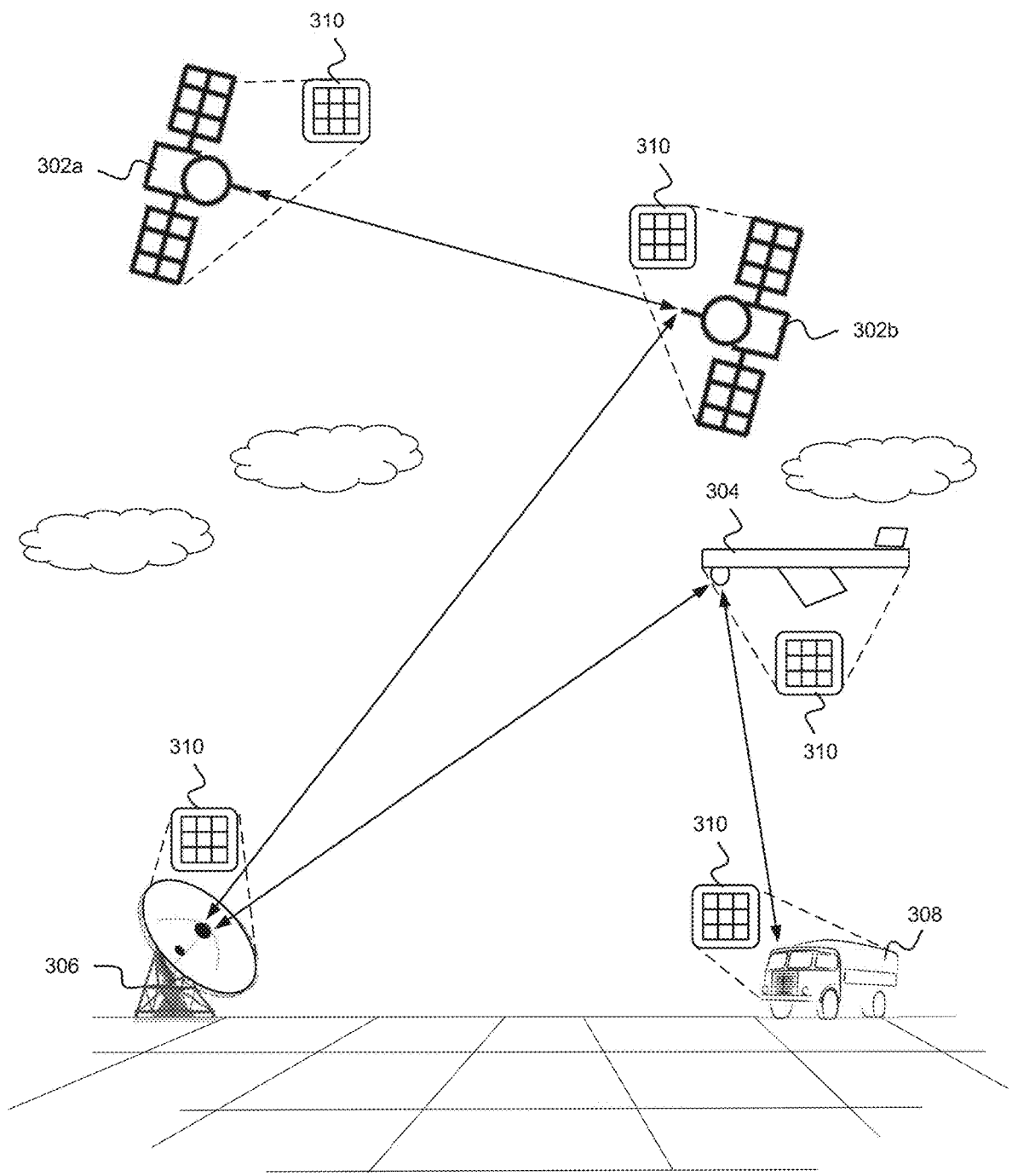
FIG. 3 is a diagram illustrating various example configurations of optical communication systems to detect and process optically transmitted information, in accordance with an example of the technology.

FIG. 3 is a diagram illustrating various example configurations of optical communication systems 310 that include wide-view event cameras and event processors to detect and process optically transmitted information, as described earlier. As illustrated, an optical communication system 310 can be coupled to many types of platforms, including, but not limited to: satellites 302a-b, communication base stations 306, manned and unmanned aerial vehicles (e.g., UAVs or "drones") 304, ground-based vehicles 308, and the like. It is further contemplated that the optical communication system 310 can be employed on different types of platforms in underwater environments, although at shorter distances.

Illustratively, satellite constellations yield key benefits through their redundant and cooperative characteristics. Dynamic inter-satellite optical communication within satellite constellations is a foundation for high-bandwidth, cooperative satellite system capabilities. Inter-constellation communications among orbital planes or in other configurations where the lines of sight among members must be dynamically reestablished requires each satellite to repeatedly reacquire valid communication partners. Establishing high bandwidth communication channels in the presence of temporal, positional, and signal uncertainties can be challenging because a communication system needs to know where, when, and how to point laser transceivers with sufficient precision to establish communication links. Furthermore, these communication networks may be subject to deliberate interference (e.g., spoofing, jamming, etc.) by hostile space vehicles. Past methods to establish communications between satellites incur tradeoffs among temporal synchronization, self-localization, and sequential spatial scanning costs to enable intended communication partners to locate each other, aim, and connect. Typically, some combination of synchronized timing, localized searching, and precision transceiver aiming are used. These activities present challenges, including: timing signals communicated via RF (radio frequency) can be disrupted; re-aiming optical transceivers via mechanical or thruster means can be expensive in terms of energy or part wear; and insufficient available transceiver count (in the case of economy or attrition) can hamper mesh formation or reconfiguration.

The present technology overcomes the challenges described above related to communications between satellites and the need to know where, when, and how to aim transmissions with sufficient precision to establish communication links. More specifically, the present technology dramatically improves responsiveness and efficiency of establishing high-speed optical links between satellites 302a-b by enabling each satellite 302a-b to identify and localize all potential communication partners simultaneously and in parallel by combining the high-bandwidth event processor 104 with the event camera 102 (described above) in an innovative and unconventional manner to discriminate coincident communications by their locations to provide spatially multiplexed communications.

FIG. 3 illustrates example implementations of the present technology. For example, satellites 302a-b can act as both communication source and destination and can be configured to emit omnidirectional optical communication signals. The satellites 302a-b both contain respective optical communication systems 310 for receiving the optical communication signals. A wide angle lens focuses these emissions onto a focal plane array of the event cameras included in the optical communication systems 310. The optically-modulated signals cause asynchronous pixel activations to occur and an associated change of brightness to be detected, each of which is encapsulated as an event by associated readout electronics and tagged with a corresponding pixel location and timestamp (e.g., E(x,y,t)). One or more event streams are sent to the event processors (e.g., event processor(s) 104 such as shown in FIG. 1), which spatially demultiplexes the event streams into individual communication streams, where each event is tagged with its location and timestamp (e.g., E(L,t)). Demodulators 108a-n (shown in FIG. 1) demodulate the communication streams to reproduce the optical communication signals which feed downstream subsystems for authentication, prioritization, and handoff to high speed optical transceivers (not shown). The optical communication systems 310 enable the satellites 302a-b to simultaneously monitor a large spatial region and respond to multiple communication data streams from a plurality of potential communication partners. Although the present technology is described above in the context of artificial satellites, it will be appreciated that the description above also applies to other types of communication sources/destinations or platforms, including communication base stations 306, aerial vehicles 304, ground-based vehicles 308, and similar platforms, and any combination of these.

Figure 4:
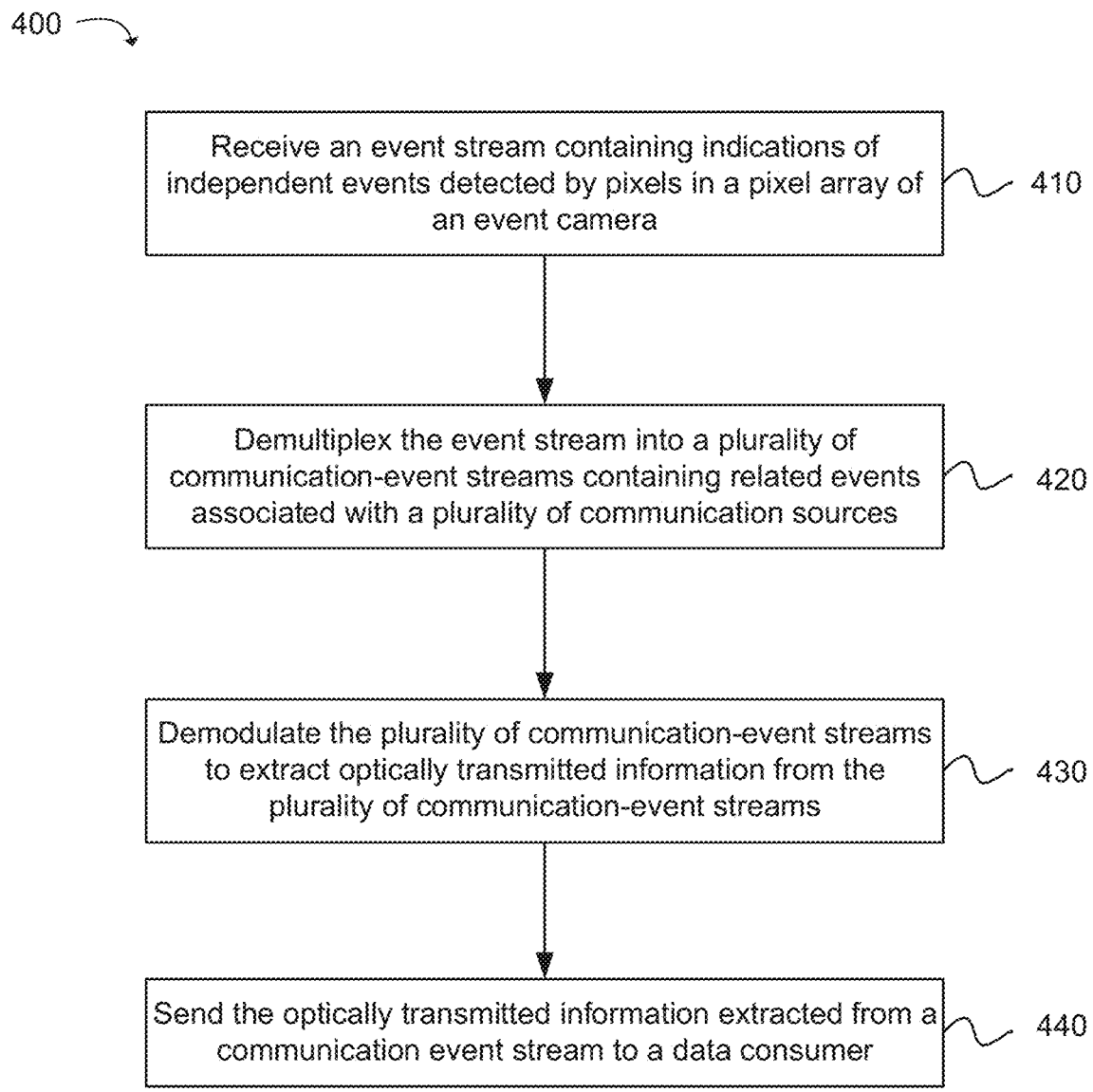
FIG. 4 is a flow diagram that illustrates an example method for monitoring a spatial region for optical communications, in accordance with an example of the technology.

FIG. 4 is a flow diagram illustrating an example method 400 for monitoring a spatial region for optical communications. As in block 410, an event stream containing indications of independent events detected by pixels in a pixel array of an event camera may be received. An event is a change in brightness detected by a pixel in the pixel array, and the pixel independently generates an indication of the event in response to detecting the event. An indication generated by a pixel may be a data packet, message, or the like containing a pixel address of a pixel in the pixel array that detected the event and a timestamp indicating a time at which the event was detected by the pixel.

As in block 420, the event stream can be demultiplexed into a plurality of communication streams containing related events associated with a plurality of communication sources, wherein related events contained in a communication stream are aggregated based in part on an event proximity and an event time that associates an event with other events contained in the event stream. Illustratively, demultiplexing the event stream is relative to a plurality of optical communications being simultaneously received at the event camera and combining indications of events (e.g., data packets) associated with the plurality of optical communications into a single event stream (multiplexing). The plurality of optical communications represented in the event stream can be separated, in parallel, into a plurality of communication streams by identifying related events in the event stream and aggregating the related events into a communication stream. Events represented in the event stream that are both close in pixel proximity and event time can be identified as being related. For example, a pixel address and timestamp of an event can be used to identify other events that have pixel addresses and timestamps that are close (e.g., adjacent) to the event. The related events can be identified as a communication (e.g., optically transmitted information) sent by a communication source, and the related events (e.g., data packets containing pixel addresses and timestamps) can be aggregated into a communication stream associated with the communication source. A communication stream can be generated for each communication represented in the event stream. Events which have not been identified as being related to other events in the event stream can be discarded (e.g., deleted or overwritten in computer memory). For example, light that is unaffiliated with a communication source can be detected by the event camera and can cause noise in the event stream. These events representing noise in the event stream can be discarded by ignoring events in the event stream that do not have a pixel address and timestamp that associates the events with other events in the event stream.

As in block 430, the plurality of communication streams can be demodulated to extract optically transmitted information from the plurality of communication streams. In one example, the event proximities and event times of the events in the communication stream can be analyzed to identify a communication encoded into the communication stream. More specifically, a demodulator can reproduce an optically transmitted information (e.g., a square wave) using the event information contained in the communication stream. For example, event times for events detected by adjacent pixels in the event camera can be averaged to resolve a duty cycle of a square wave represented by the events. As in block 440, a plurality of communications extracted from the plurality of communication streams can be sent to data consumers (e.g., an optical receiver, an application, a program, a process, or other consumer of optically transmitted information), which can extract communications encoded in the plurality of communications.

Figure 5:
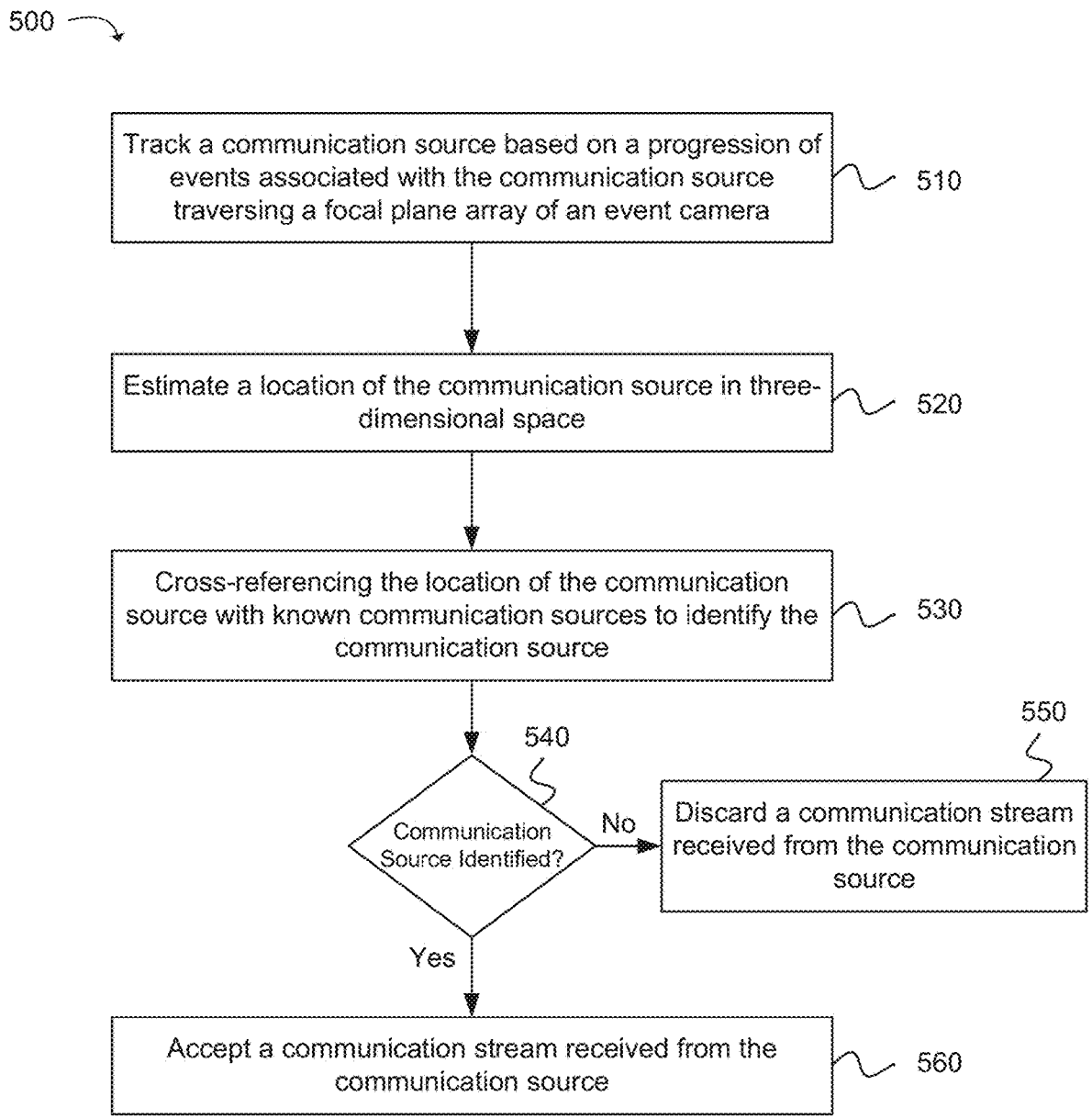
FIG. 5 is a flow diagram illustrating an example method for validating a communication received from a communication source, in accordance with an example of the technology.

FIG. 5 is a flow diagram that illustrates an example method 500 for validating a communication received from a communication source. As in block 510, the method 500 can track a communication source based on a progression of events associated with the communication source traversing a focal plane array of an event camera. As one example, the method 500 can include utilizing a fast corner-detection algorithm that that analyzes the distribution of timestamps around a current event to decide on the presence of a corner and track the communication using the corner. A moving corner will create, locally, a pixel map of timestamps with two clearly separated regions of recent events and prior events (i.e., high and low values). Corners are detected by searching for contiguous pixels with higher timestamps than the other pixels, and the moving corners can be tracked. As another example, the method 500 can include computing spatial convolutions for an event stream and tracking the spatial convolutions (e.g., computing the convolution of a linear spatial kernel with the output of the event camera that encodes convolved image information, which is updated asynchronously as each event arrives from the event camera). For example, the method 500 can include a parallel collection of continuous-time filters that are solved asynchronously as discrete updates using exact interpolation. A solution to the associated ordinary differential equation of the filter can be computed in continuous time and evaluated at discrete time instances.

As in block 520, a location of a communication source in 3D space can be estimated. As part of tracking the communication source, the location of the communication source can be estimated using location and orientation data for the event camera (or vehicle to which the event camera is coupled) and a path of events across the focal plane array of the event camera. The estimated location of the communication source in 3D space can be cross-referenced with known communication sources, as in block 530, to attempt to positively identify the communication source. Illustratively, the estimated location can be cross-referenced or mapped to a data table of source communication identities containing expected physical locations of communication sources at specified times. In one example, the data table can be stored with an optical communication system that includes the event camera. In another example, that data table can be stored remotely (e.g., in a data center) and the optical communication system can query the data table over a network. The network may include any useful computing network, including a wireless data network implemented over a satellite network, or any other such network or combination of networks. Components utilized for such a network may depend at least in part upon the type of network and/or environment selected. Communication over the network may be enabled by wired or wireless connections and combinations thereof.

As in block 540, if the communication source is able to be identified using the location of the communication source, then as in block 560, the communication source may be considered a trusted communication source, and a communication stream received from the communication source may be accepted. As will be appreciated, additional authentication and security protocols can be performed before accepting a communication stream as a valid communication from a communication source. For example, the communication stream may be provided to downstream subsystems for further authentication, prioritization, and handoff to high speed optical transceivers. In the case that the estimated location of the communication source cannot be cross-referenced with a known communication source, then as in block 550, a communication stream received from the unknown communication source may be considered untrusted and the communication stream can be discarded or ignored.

Figure 6:
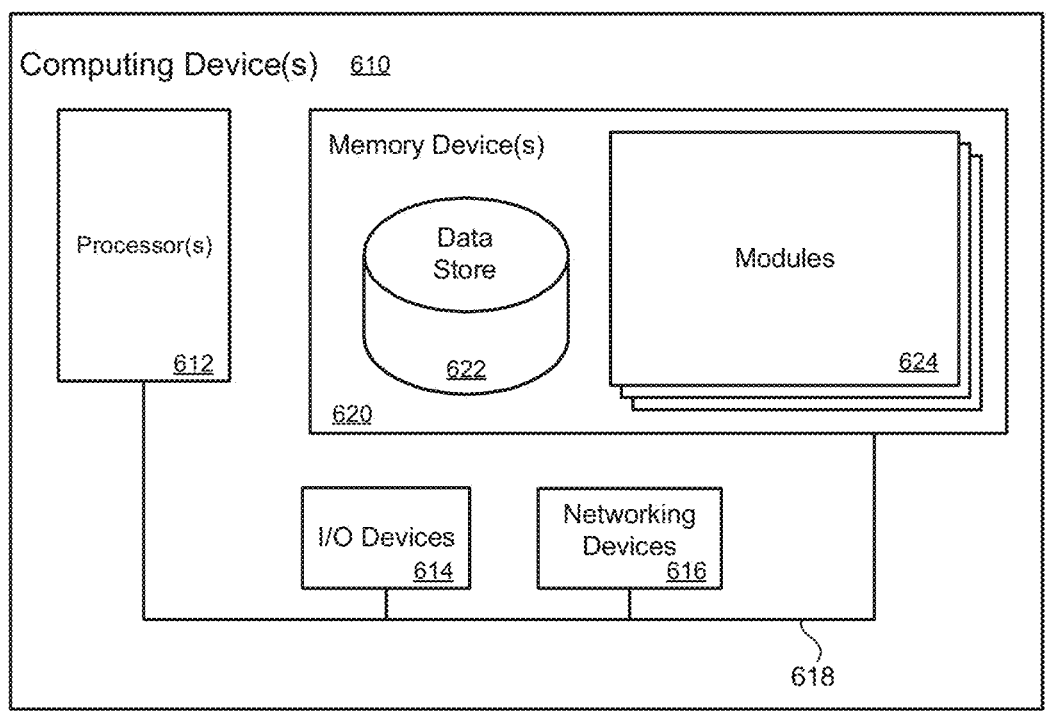
FIG. 6 is a block diagram illustrating an example of a computing device that may be used to execute the methods described herein.

FIG. 6 illustrates a computing device 610 on which modules of this technology can execute. The computing device 610 illustrated is a high-level example of a device on which the present technology can be executed. The computing device 610 can include one or more processors 612 that are in communication with one or more memory devices 620. In one example, the computing device 610 can be a field-programmable gate array (FPGA) which is programmed to execute the optical communication method described herein. The computing device 610 can include a local communication interface 618 for the components in the computing device 610. For example, the local communication interface 618 can be a local data bus and/or any related address or control busses as may be desired.

The memory device 620 can contain modules 624 that are executable by the processor(s) 612 and data for the modules 624. In one example, the memory device 620 can include an event module, demodulator modules, identity module, and other modules. In one example, one or more modules can be executed in parallel to enable simultaneous demodulation of multiple, individual, communication streams. The modules 624 can execute the functions described earlier. A data store 622 can also be located in the memory device 620 for storing data related to the modules 624 and other applications along with an operating system that is executable by the processor(s) 612.

Other applications can also be stored in the memory device 620 and may be executable by the processor(s) 612. Components or modules discussed in this description that can be implemented in the form of software using high-level programming languages that are compiled, interpreted, or executed using a hybrid of the methods described herein.

In some examples, the computing device 610 can have access to I/O (input/output) devices 614 that are usable by the computing device 610 to communicate with other computing devices (e.g., obtain source identity data through a network). Networking devices 616 and similar communication devices can be included in the computing device 610. The networking devices 616 can be wired or wireless networking devices that connect to the internet, a LAN, WAN, or other computing network.

The components or modules that are shown as being stored in the memory device 620 can be executed by the processor(s) 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory to be executed by a processor. The executable program can be stored in any portion or component of the memory device 620. For example, the memory device 620 can be random access memory (RAM), read only memory (ROM), flash memory, a solid state drive, memory card, a hard drive, or any other type of memory component.

The processor 612 can represent multiple processors and the memory device 620 can represent multiple memory units that operate in parallel to the processing circuits. This can provide parallel processing channels for the processes and data in the system. The local communication interface 618 can be used as a network to facilitate communication between any of the multiple processors and multiple memories. The local communication interface 618 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for optical communication, comprising:
an event camera having a pixel array comprising a plurality of pixels, each pixel of the pixel array being configured to independently detect an event representative of a change in brightness detected by the pixel, and to independently generate an indication of the event in response to detecting the event;
at least one processor;

a memory device including instructions that, when executed by the at least one processor, cause the system to:
receive an event stream from the event camera, wherein the event stream contains indications of events detected by at least a portion of the pixels in the event camera;
identify related events in the event stream based in part on event proximity and event time;
identify the related events as a communication sent by a communication source;
aggregate the related events to form a communication stream associated with the communication sent from the communication source; and
demodulate the communication stream to extract the communication from the communication stream.

2. The system in claim 1, wherein the memory device further includes instructions that, when executed by the at least one processor, cause the system to demultiplex the event stream into a plurality of communication streams associated with a plurality of communication sources.

3. The system in claim 1, wherein the memory device further includes instructions that, when executed by the at least one processor, cause the system to discard events contained in the event stream that are unrelated to other events contained in the event stream.

4. The system in claim 1, wherein the memory device further includes instructions that, when executed by the at least one processor, cause the system to track the communication source based in part on a progression of detected events associated with the communication source that traverse a focal plane array of the event camera.

5. The system in claim 1, wherein the memory device further includes instructions that, when executed by the at least one processor, cause the system to:
determine a directional vector to a location of the communication source in three-dimensional space based in part on detected events associated with the communication source traversing a focal plane array of the event camera; and
determine an identity of the communication source based on the directional vector to the location of the communication source.

6. The system in claim 1, wherein the memory device further includes instructions that, when executed by the at least one processor, cause the system to determine that a communication source associated with a received communication is a valid communication source.

7. The system in claim 1, wherein the instructions that, when executed by the at least one processor, cause the system to demodulate the communication stream, further analyze event proximities and event times of the events in the communication stream to identify a communication signal encoded into the communication stream.

8. The system in claim 1, further comprising an array of event cameras configured to generate a plurality of event streams containing communications from a plurality of communication sources.

9. A computer implemented method for monitoring a spatial region for optical communications, comprising:
receiving an event stream containing indications of independent events detected by pixels in a pixel array of an event camera, wherein each pixel of the pixel array is configured to independently detect an event representative of a change in brightness detected by the pixel, and to independently generate an indication of the event in response to detecting the event;
demultiplexing the event stream into a plurality of communication streams containing related events associated with a plurality of communication sources, wherein events contained in a communication stream are aggregated based in part on an event proximity and an event time that associates an event with other events contained in the event stream;
demodulating the plurality of communication streams to extract optically transmitted information from the plurality of communication streams; and
sending the optically transmitted information to a data consumer.

10. The method in claim 9, wherein the indication of events in the event stream include locations of pixels in the pixel array that detected the events and timestamps indicating a time that the events were detected.

11. The method in claim 9, further comprising:
identifying events contained in the event stream that are unrelated to other events contained in the event stream; and
discarding the events as noise contained in the event stream.

12. The method in claim 9, further comprising tracking the communication source based on a progression of the events associated with the communication source traversing a focal plane array of the event camera.

13. The method in claim 9, further comprising determining a location of a communication source in three-dimensional space based in part on a path of events across the pixel array of the event camera.

14. The method in claim 13, further comprising cross-referencing the location of the communication source with a known communication source location to identify the communication source.

15. The method in claim 9, wherein demodulating the plurality of communication streams further comprises analyzing event proximities and timestamps associated with the events contained in a communication stream to identify optically transmitted information encoded in the communication stream.

16. The method in claim 9, wherein the event camera is included in an optical communication system coupled to an artificial satellite which receives optically transmitted information from one or more artificial satellites or ground stations.

17. A non-transitory machine readable storage medium including instructions embodied thereon, wherein the instructions, when executed by at least one processor:
receive an event stream from an event camera containing a pixel array, wherein the event stream contains indications of independent events detected by pixels in the pixel array, wherein an event is a change in brightness detected by a pixel in the pixel array, and the pixel independently generates an indication of the event in response to detecting the event;
identify related events in the event stream based in part on proximity of event location and event time;
label the related events as a communication from a communication source;
aggregate the related events labeled as the communication to form a communication stream associated with the communication source; and
demodulate the communication stream to extract optically transmitted information from the communication stream, wherein event proximities and event times of the events in the communication stream are analyzed to identify the optically transmitted information in the communication stream.

18. The non-transitory machine readable storage medium in claim 17, further comprising instructions, that when executed by the at least one processor, track the communication source in three-dimensional space, wherein a progression of events associated with the communication source traversing a focal plane array of the event camera are used to determine a location of the communication source and track the location of the communication source.

19. The non-transitory machine readable storage medium in claim 18, further comprising instructions, that when executed by the at least one processor;
- map the location of the communication source to a trusted communication source; and
- determine that the communication is a trusted communication based in part on the communication source being identified as a trusted communication source.

20. The non-transitory machine readable storage medium in claim 17, wherein the instructions, that when executed by the at least one processor, demodulate the communication stream further extract the optically transmitted information from the communication stream based on event transitions between adjacent pixels.

\* \* \* \* \*